United States Patent [19]

McGinness

[11] 4,366,216
[45] Dec. 28, 1982

[54] ELECTRICAL ENERGY STORAGE

[75] Inventor: John E. McGinness, Houston, Tex.

[73] Assignee: MB-80 Energy Corporation, Houston, Tex.

[21] Appl. No.: 222,018

[22] Filed: Jan. 2, 1981

[51] Int. Cl.³ ............................................. H01M 4/60
[52] U.S. Cl. ..................................... 429/213; 429/152
[58] Field of Search ............... 429/212, 213, 214, 215, 429/152, 162

[56] References Cited

U.S. PATENT DOCUMENTS

| 2,874,204 | 2/1959 | Morehouse et al. | 429/213 X |
| 2,880,122 | 3/1959 | Morehouse et al. | 429/212 X |
| 3,594,231 | 7/1971 | Kraebel | 429/213 X |
| 3,660,164 | 5/1972 | Hermann et al. | 429/213 X |
| 3,993,501 | 11/1976 | Kalaoki-Kis | 429/212 X |
| 4,246,326 | 1/1981 | Sprengel et al. | 429/212 X |
| 4,276,362 | 6/1981 | Harvey | 429/213 |

Primary Examiner—Charles F. Lefevour
Attorney, Agent, or Firm—Robert H. Epstein

[57] ABSTRACT

Electrical energy is stored in a device formed of electrodes coupled with an oxidation-reduction polymer material, such as a polymer of quinone, semiquinone and hydroquinone units, when a current is supplied to the device to create a charge gradient thereacross with units at the positive end being oxidized and units at the negative end being reduced. The charge gradient across the electrical storage device is increased by arranging a plurality of electrically conductive barrier laminations made of a material preventing ion passage therethrough in the oxidation-reduction polymer material to create separated regions of reduced and oxidized functional groups producing an additive charge gradient.

15 Claims, 7 Drawing Figures

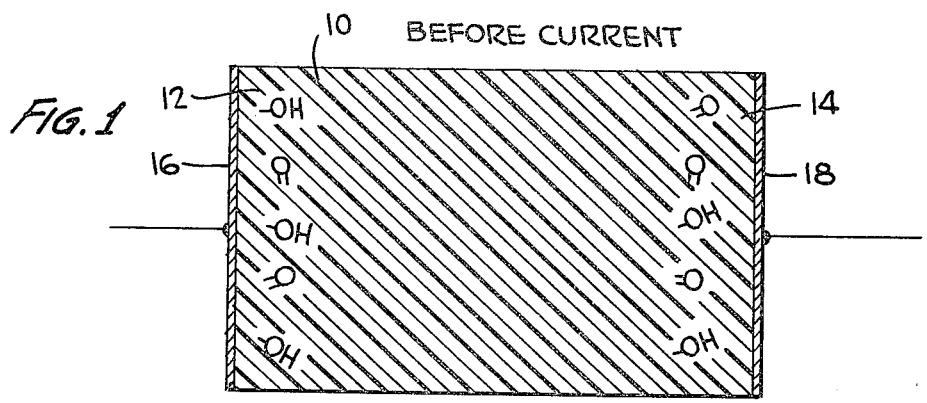
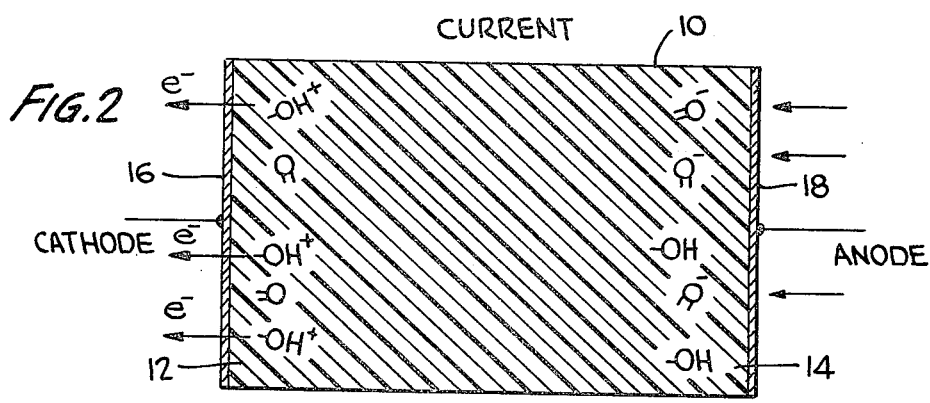
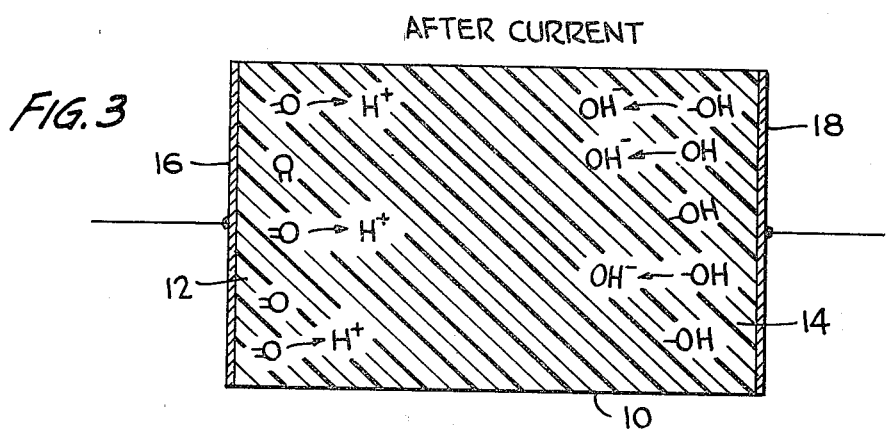
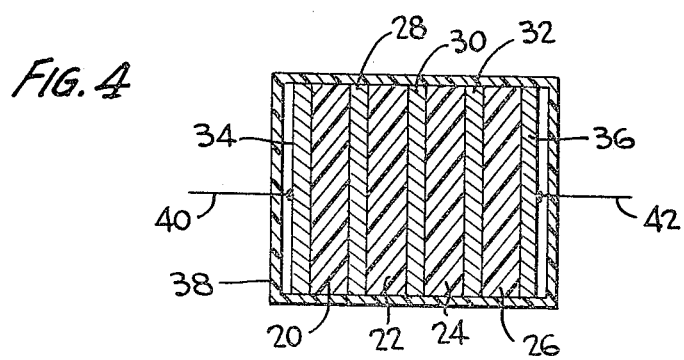

ELECTRICAL ENERGY STORAGE

BACKGROUND OF THE INVENTION

1. Field of the Invention

The present invention pertains to energy storage and, more particularly, to devices and methods for storing electrical energy using organic materials.

2. Discussion of the Prior Art

Electrical energy is conventionally stored in batteries wherein electrons are passed via electrodes into an electrolyte by means of an ionic modification within the battery. Conventional batteries utilize a metallic electrode interacting with an ionic solution, or electrolyte, such that, as the electrode dissolves, electrons are released for ionic storage in the electrolyte; and, accordingly, such batteries are referred to herein as ionic batteries since electrical energy is stored and released thereon on an ionic basis. In discharging ionic batteries, the electrons are released at the electrodes. Such conventional ionic batteries have the disadvantages of being slow to charge, being able to discharge large currents for only brief periods, requiring electrodes made of specific and usually rare metals, and consuming the electrodes thereby limiting battery lifetime.

Many attempts have been made to increase the efficiency, charging rate and lifetime of ionic batteries; however, such attempts have not met with success in that, while they have improved some characteristics of such batteries, they still rely on the ionic process of energy storage thereby retaining relatively long charge times and consumable electrodes due to the inherent low mobility of ions in the electrolyte.

One area where substantial efforts have been made to improve electrical energy storage is for use with electric vehicles, and most of these efforts have been directed toward improving batteries to provide efficient operation of electric motors and conservation of energy. To date, however, while many sophisticated battery systems have been devised, such systems still suffer from decreased lifetimes relative to charging and discharging cycles, long charging times, and the requirement of materials expensive to produce and, in many cases, hazardous to produce.

Research in melanins has resulted in the discovery of switching characteristics providing high and low resistance states in response to voltage as described by John E. McGinness et al. in an article entitled "Amorphous Semiconductor Switching in Melanins," 1974, Science, Vol. 183, pp. 853–855, by C. H. Culp et al. in an article in the Journal of Applied Physics, 1975, Vol. 46, pp. 3658–3659, by J. Filatous et al. in an article entitled "Thermal and Electronic Contributions to Switching in Melanins," 1976, Biopolymers, Vol. 15, pp. 2309–2312, and by F. W. Cope in an article entitled "Inversions of Emulsions of Aggregated Electrons as a Possible Mechanism for Electrical Switching in Wet Melanin," 1977, Physiological Chemistry and Physics, Vol. 9, pp. 543–546. V. Horak et al. discuss oxidation reduction of dopa melanin in an article entitled "A Study of The Oxygen Reduction State of Synthetic Dopa Melanin," 1971, Molecular Pharmacology, Vol. 1, pp. 429–433, and characteristics of melanin are further discussed by P. R. Crippa in an article "Struttura Electronica e Proprieta Funzionali Delle Malanine," Att. Accademia Gioenia de Catania, Serie VII, Vol. XI, 1979. Studies of melanin and their electrical characteristics have produced only the recognition of the switching characteristics thereof; and, after disclosure of such switching characteristics, studies of the electrical characteristics of melanins failed to yield any information leading to other beneficial electrical characteristics of melanins even by those on the forefront of the semiconductor field.

SUMMARY OF THE INVENTION

Accordingly, it is a primary object of the present invention to overcome the above-mentioned disadvantages of conventional ionic batteries by providing an electrical energy storage device and method operating on an electronic rather than ionic basis.

Another object of the present invention is to utilize the oxidation-reduction characteristics of organic polymers to store electrical energy and discharge the stored electrical energy.

A further object of the present invention is to utilize a polymer of randomly recurring quinone, semiquinone and hydroquinone units to form an electrical energy storage device.

The present invention has another object in that electrical energy is stored by a method including the step of supplying an electrical current to a polymer of quinone, semiquinone and hydroquinone units to create a proton gradient in the polymer.

Yet a further object of the present invention is to form an electrical energy storage device of an oxidation-reduction polymer material coupled between a pair of electrodes with one or more barrier laminations of an electrically conductive material preventing ion passage therethrough disposed in spaced relation in the polymer material.

Another object of the present invention is to increase the charge gradient across the electrodes of an electrical energy storage device having an oxidation-reduction polymer material coupled between the electrodes by arranging a plurality of spaced, electrically conductive barrier laminations.

The present invention has a further object in the use of an oxidation-reduction polymer to store an electrical charge wherein the polymer has a hydration range of 1 to 25% by weight, the hydration range being preferably between 10 and 15% by weight.

An additional object of the present invention is to provide an electrical energy storage device that operates on an electronic basis to permit extremely fast charging, the electrical energy storage device including an oxidation-reduction polymer material having electrons injected therein followed by an ionic release.

In accordance with a further object of the present invention, electrical energy is stored by passing an electrical current through a polymer of quinone, semiquinone and hydroquinone units such that quinone units at a negative end of the polymer are reduced and hydroquinone units at a positive end of the polymer are oxidized to create a proton gradient across the polymer.

The present invention has another object in that a method of storing and discharging electrical energy includes passing an electrical current through an oxidation-reduction polymer to create an energy containing gradient thereacross by withdrawing electrons from lower energy sites and storing the electrons at higher energy sites, the stored energy being discharged to deliver a current from the oxidation-reduction polymer material by withdrawing the electrons from the higher energy sites and returning the electrons to the lower energy sites.

Some of the advantages of the present invention over the prior art are that electrical energy storage devices according to the present invention do not have consumable electrodes, have extremely fast charge times on the order of twenty times faster than ionic electrical energy storage devices, operate on an electronic basis rather than an ionic basis, require no liquid phase materials, have extremely long lifetimes permitting, theoretically, limitless charging and discharging cycles, can be made of readily available, light weight, non-toxic materials, and can deliver electrical energy the same as that of a conventional ionic battery via an energy storage device of substantially less size and weight. The electrical storage device of the present invention is particularly advantageous for use in powering electrically driven vehicles in that the electrical storage device can be charged very quickly and can, accordingly, be more fully charged via systems operating on vehicle momentum thereby minimizing loss by increasing efficiency. The electrical storage device is light in weight due to the oxidation-reduction polymer and the non-consumption of electrodes permitting their construction of light weight materials, such as aluminum, and the electrical storage device can have any desirable shape facilitating incorporation into the vehicle body construction.

The present invention is generally characterized in a method of storing electrical energy including the step of passing an electrical current through an oxidation-reduction polymer material containing functional groups reversibly oxidizable and reducible by electron withdrawal and acceptance to produce an energy containing gradient across the polymer material.

The present invention is further generally characterized in an electrical energy storage device including a pair of spaced electrodes, and an oxidation-reduction polymer material coated on the electrodes to store a charge when an electrical current is supplied thereto.

The present invention is further generally characterized in a method of storing and discharging electrical energy including the steps of storing charge by passing a current through an oxidation-reduction polymer material to withdraw electrons from reversibly oxidizable functional groups of the oxidation-reduction polymer material and injecting electrons in reversibly reducible functional groups of the oxidation-reduction polymer material to store electrons possessing increased energy, and discharging the stored charge to deliver a current by withdrawing the increased energy electrons from the previously reduced functional groups of the oxidation-reduction polymer material and returning the increased energy electrons to the previously oxidized functional groups of the oxidation-reduction polymer material.

The present invention is further generally characterized in an electrical energy storage device including a pair of spaced electrodes, an oxidation-reduction polymer material coupled with the electrodes, and a plurality of barrier laminations made of an electrically conductive material preventing ion passage therethrough, the barrier laminations being disposed in spaced relation in the oxidation-reduction polymer material to define layers of the oxidation-reduction polymer material whereby the charge gradient across the layers is cumulative.

Other objects and advantages of the present invention will become apparent from the following description of the preferred embodiment taken in conjunction with the accompanying drawings.

BRIEF DESCRIPTION OF THE DRAWINGS

FIGS. 1, 2 and 3 are diagrammatic drawings illustrating the theory of operation of the electrical storage device of the present invention.

FIG. 4 is a schematic drawing of an electrical storage device according to the present invention.

DESCRIPTION OF THE PREFERRED EMBODIMENT

Figure 5:
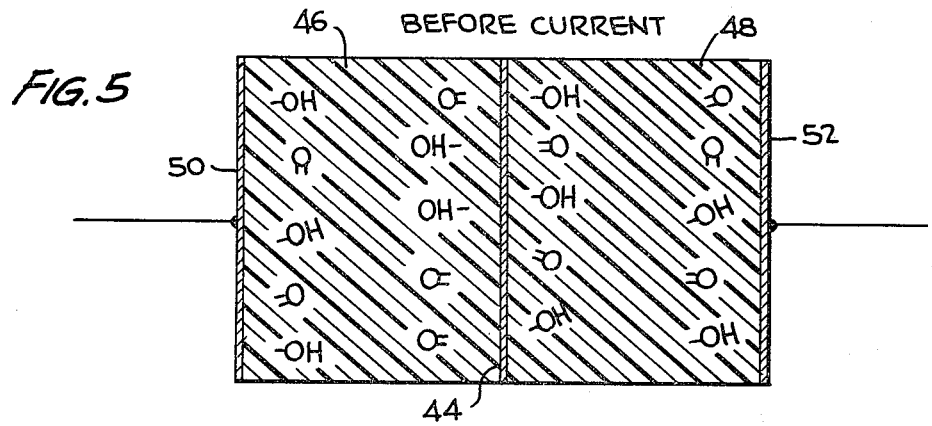
FIGS. 5, 6 and 7 are diagrammatic drawings illustrating the theory of operation of the electrical storage device of FIG. 4.

The present invention is based on the discovery that, when an electrical current is passed through an oxidation-reduction polymer material, such as a polymer of quinone, semiquinone and hydroquinone randomly recurring units, an electrical charge will be stored at sites in the polymer where the electrons gain a usable potential energy due to a concentration gradient generated by oxidized and reduced functional groups produced by electrons binding protons upon reduction and releasing protons upon oxidation as well as the energy contained in the charge gradient consisting of protons and hydroxyl ions which have been left behind. Electrical energy storage devices formed of an oxidation-reduction polymer coupled with a pair of electrodes in accordance with the present invention can, accordingly, be charged by passing a current therethrough and thereafter discharged by coupling a load with the electrical energy storage device to be supplied with current discharged by the electrical storage device as protons are released and reabsorbed in the polymer. The charge gradient created across an oxidation-reduction polymer material was discovered by measuring pH at the ends of an oxidation-reduction polymer after a current was passed therethrough, it being noted that current had been passed through similar materials as reported by John E. McGinness et al. in an article entitled "Amorphous Semiconductor Switching in Melanins," 1974, Science, Vol. 183, pp. 853–855, by C. H. Culp et al. in an article in the Journal of Applied Physics, 1975, Vol. 46, pp. 3658–3659, by J. Filatous et al. in an article entitled "Thermal and Electronic Contributions to Switching in Melanins," 1976, Biopolymers, Vol. 15, pp. 2309–2312, and by F. W. Cope in an article entitled "Inversions of Emulsions of Aggregated Electrons as a Possible Mechanism for Electrical Switching in Wet Melanin," 1977, Physiological Chemistry and Physics, Vol. 9, pp. 543–546, with only the switching characteristics of the material recognized.

While the operation of oxidation-reduction polymers in storing electrical energy is not precisely understood, it is theorized that upon application of a current to the polymer, oxidation and reduction occur at opposite ends of the polymer to produce a charge gradient. Where the polymers are formed of quinone, semiquinone and hydroquinone units, quinone units at the negative end of the polymer are reduced thereby gaining electrons and hydroquinone units at the positive end of the polymer are oxidized thereby losing electrons while a finite number of semiquinones exist in the middle of the oxidation-reduction cycle to shift to a quinone state at the positive end and to a hydroquinone state at the negative end.

The oxidation-reduction process takes place in accordance with the following formula:

| At The Negative End | At The Positive End |
|---|---|
| $Q + H^+ + e^- \rightarrow \dot{Q}H$ | $QH_2 \rightarrow \dot{Q}H + H + e^-$ |
| $\dot{Q}H + H^+ + e^- \rightarrow QH_2$ | $\dot{Q}H \rightarrow Q + e^- + H$ |

An explanation of the theory upon which the present invention is believed to operate is described with respect to FIG. 1 wherein an oxidation-reduction polymer material 10 is shown coupled at opposite ends 12 and 14 to electrodes 16 and 18, respectively, which are adapted to be connected with an electrical energy charging source, not shown. The polymer material 10 contains quinone, semiquinone and hydroquinone randomly recurring units with the functional groups only thereof illustrated to facilitate understanding. Quinone functional groups are illustrated as "=O" while hydroquinone functional groups are illustrated as "—OH," it being appreciated that semiquinones contain a quinone functional group and a hydroquinone functional group. Prior to the supply of an electrical current through the polymer material, the quinone, semiquinone and hydroquinone units will be randomly distributed throughout the polymer material as indicated in FIG. 1 by the distribution of functional groups.

When an electrical current is supplied to the polymer material 10, electrons (e—) are supplied to the polymer material at electrode 18, as shown in FIG. 2; and, since electrons are more mobile in a given applied field than ions, the electrons are shown passing through the polymer material 10 without functional group change in FIG. 2. Thereafter, protons are released to produce quinones adjacent electrode 16, which can be considered the anode of the electrical storage device, and bound to produce hydroquinones adjacent electrode 18, which can be considered the cathode of the electrical storage device. Accordingly, a proton or charge gradient and a concentration or oxidation-reduction gradient is formed across the polymer material, and these gradients can be discharged through a load connected across the electrodes 16 and 18 by release of protons as electrons are withdrawn from the polymer material and binding of protons where they are returned.

Only electron current involving functional groups is illustrated in FIGS. 1, 2 and 3 and FIGS. 5, 6 and 7, to be discussed hereinafter, to simplify the drawings and facilitate understanding of the present invention. It should be understood that these drawings are symbolic and abstract in nature to facilitate understanding of the theory of operation of the present invention and that all functional groups adjacent regions 12 and 14 will not necessarily be oxidized and reduced.

It has been found that the charge gradient established across the polymer material can be increased by forming an electrical energy storage device of a plurality of layers of polymer material 20, 22, 24 and 26 with a plurality of barrier laminations 28, 30 and 32 disposed therebetween, the barrier laminations being formed of a material forming a barrier to ion movement while permitting passage of electrons therethrough, such as copper, aluminum, titanium or graphite. Electrodes 34 and 36 are disposed in contact with opposite ends of the laminated polymer material and can be made of any suitable electrically conductive material. A housing 38 surrounds the electrical storage device to provide an hermetic seal therearound, and leads 40 and 42 extend through the ends of the housing to contact the electrodes 34 and 36, respectively.

Figure 6:
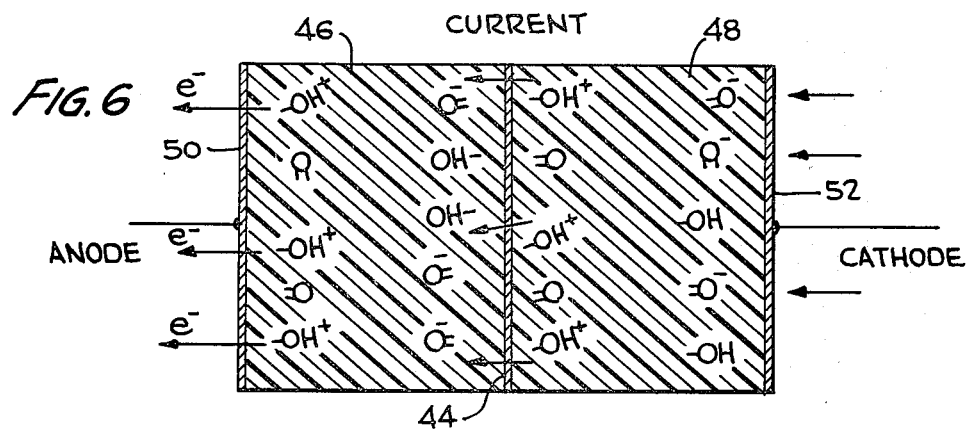
Figure 7:
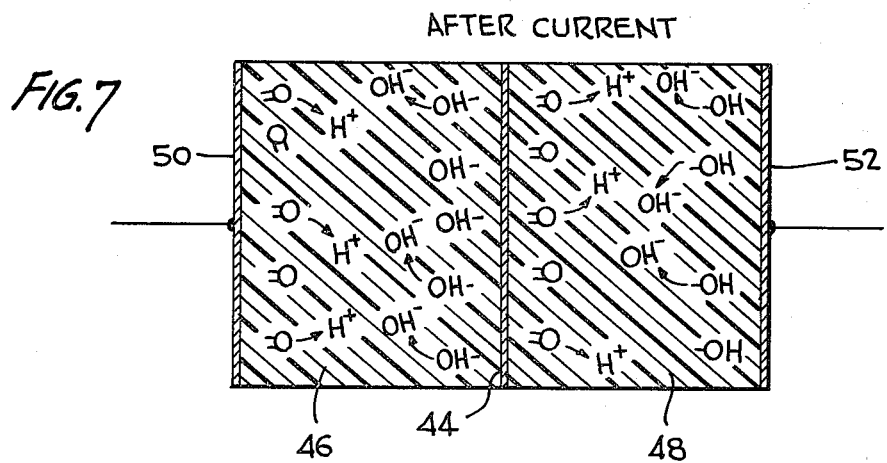

The laminated electrical energy storage device of FIG. 4 is believed to operate, in theory, in the manner illustrated in FIGS. 5, 6 and 7 wherein only a single barrier lamination 44 is illustrated as being positioned between layers of polymer material 46 and 48 sandwiched on their opposite sides by electrodes 50 and 52, respectively. The number of barrier laminations shown in FIGS. 4, 5, 6, 7 and 8 are exemplary only, and it is noted that any number of laminations can be used in the electrical energy storage device of the present invention, the number of laminations being preferably as great as possible to create a maximum charge gradient. Prior to an electrical current being supplied to the electrical energy storage device, the quinones, semiquinones and hydroquinones are in a random distribution as illustrated by the functional groups shown in FIG. 5; and, once a current is supplied to the electrical energy storage device by supplying electrons at electrode 52, which can be considered the cathode, the electrons (e—) will initially pass through the polymer materials 46 and 48 and the barrier laminations 44 without functional group change since electrons are more mobile in a given applied field than ions, as shown in FIG. 6. As illustrated in FIG. 7, the result of the barrier lamination 44 is to double the charge separation produced by the releasing and binding of protons relative to the example of FIGS. 1, 2 and 3. That is, the region near the anode has excess protons and the region near the cathode has excess hydroxyls while a new region of excess hydroxyls is created adjacent the anode side of the barrier lamination and a new region of excess protons is created adjacent the cathode side of the barrier lamination. Accordingly, to maximize stored charge, it is desirable to have as many laminations as possible within a fixed volume.

Looking at the charge gradient alone, it will be appreciated that intrinsic charge decay occurs if the protons and hydroxyls are free to move and recombine; and, in order to stabilize the charge separation, it is desirable to reduce the liquid content or hydration of the polymer material to reduce mobility. Another method of stabilizing charge separation is to leave the charge on the polymer material itself. For example, a polymer containing functional groups, such as primary or secondary amines, like $NH_2$, which can bind protons to become charged amines, like $NH_3+$, or carboxyls like $COO^-$ which can become COOH, will trap protons to prevent recombination. Such polymers are modified or selected to bind protons and hydroxyls, either chemically or electrostatically, in the regions where they are formed to minimize recombination.

Electrical energy storage devices according to the present invention utilize oxidation-reduction polymers which are defined as polymers containing functional groups which can be reversibly oxidized by removing one or more electrons from each functional group and thereafter reduced by adding one or more electrons to each functional group. Examples of functional groups that can be involved in oxidation-reduction within an oxidation-reduction polymer, in addition to phenolic oxygen functional groups, are organic acids including carboxylic acid functional groups, nitrogen functional groups, such as amines, sulfur-containing functional groups, the family of alcohol, aldehyde and carboxylic acid functional groups and combinations of the above functional groups, such as an alpha ketone next to a carboxylic acid.

The present invention is further illustrated by means of the following examples showing the preparation of oxidation-reduction polymers for use in electrical storage devices according to the present invention and the construction and operation of electrical storage devices according to the present invention:

EXAMPLE I 50 grams of dopamine were added to 500 ml of water and 100 ml of 0.05 molar NAOH in a 2000 ml beaker at 22° C. The solution was left stirring with a Fisher Scientific magnetic stirrer at 22° C. and 70% humidity for three weeks. The remaining water was removed by subjecting the beaker containing the solution for 24 hours to a vacuum at 37° C. supplied by a vacuum pump. The resulting polymer material was a black powder of a very fine consistency which was then placed in a storage bottle by shaking the powder out of the beaker.

EXAMPLE II 50 grams of dopamine were added to 500 ml of water and 100 ml of diethylamine (DEA) in a 1000 ml beaker at 22° C. The solution was left stirring with a Fisher Scientific magnetic stirrer at 22° C. and 70% humidity for three weeks. The remaining water was removed by subjecting the beaker containing the solution for 24 hours to a vacuum at 37° C. supplied by a vacuum pump. The resulting polymer material was a black powder of a very fine consistency which was then placed in a storage bottle by shaking the powder out of the beaker.

EXAMPLE III 100 grams of hydroquinone were added to 1000 ml of solution containing 1 ml tetranitromethane, 100 ml of diethylamine (DEA) and 900 ml of water in a 2000 ml beaker at 22° C. The hydroquinone gradually entered the solution as polymerization proceeded the solution was stirred with a Fisher Scientific magnetic stirrer continuously at 22° C. After 21 days, the stirring action was stopped and the polymer had a uniform density and was of a black color. The polymer was left in the beaker without stirring for seven days and the polymer precipitated as a sludge at the bottom of the beaker. The sludge was removed from the beaker with a spatula and had a granular consistency, was black in color, had a molasses-like viscosity and adhered readily to metal and plastic surfaces.

EXAMPLE IV

An electrical storage device was constructed using DEA dopamine melanin (DEADM) prepared in accordance with Example II as the polymer material. DEAM powder was rehydrated by exposing the powder to steam to produce 20% water content by weight and 100 mgs of the rehydrated polymer material was coated on titanium metal plates measuring 2.5 cm by 2.5 cm surface area and 0.90 mm thickness. Nine plates were coated on both sides and two plates were coated on one side. The DEADM coated plates were pressed together sandwiching 200 mg of DEAM between adjacent metal plates to produce an electrical storage device having ten layers of DEAM, nine barrier laminations and two electrodes measuring 2 cm in length. The electrical storage device was encased in a plexiglass housing measuring 4 cm by 4 cm by 3 cm. Contacts were formed on the electrical storage device by threading a screw into opposite plexiglass faces of the housing to contact the end plates or electrodes of the electrical storage device. The plexiglass was sealed with #3 Weld.On plastic cement manufactured by the Industrial Polychemical Service to prevent hydration of the DEAM from changing from the 20% value at the time of construction.

The electrical storage device was charged by applying 200 v for 10 seconds across the electrodes at an average current of 25 ma. The energy storage device was monitored with a voltmeter connected across the electrodes and a milliammeter connected in series between one electrode and one terminal of a piezoelectric buzzer having an impedance of 15 KΩ, the other terminal of the buzzer being connected to the opposite electrode of the electrical storage device. The buzzer emitted a sound for a four-minute period after connection. When the buzzer was connected, the voltage across the electrical storage device was 6 v and the current delivered was 4 ma, and during a two-minute period immediately after connection, the voltage fell from 6 v to 3 v and the current fell from 0.4 ma to 0.2 ma. During the following two-minute interval, the voltage fell from 3 v to 1.8 v and the current fell from 0.2 ma to 0.1 ma. The buzzer possessed a 2 v cutoff and no longer was audible although energy was still stored in the electrical storage device.

Using the same voltmeter and ammeter connections with various loads, the following results were obtained for the cited charging conditions:

| CHARGING CONDITIONS | Measured Upon Connection with Load | | | |
|---|---|---|---|---|
| | LOAD 100K | LOAD 10K | LOAD 1K | LOAD 0.1K |
| 250V | | | | |
| 10MA | 2.3V | 1.5V | 0.2V | .04V |
| 10 sec. | .02MA | .08MA | .25MA | .3MA |
| 200V | | | | |
| 10MA | 5.6V | 2.3V | .3V | .03V |
| 1 Min. | .06MA | .23MA | .4MA | .4MA |
| 200V | | | | |
| 10MA | 6V | 2.5V | .4V | .03V |
| 1 Min. | .06MA | .26MA | .4MA | .3MA |
| 50% Duty Cycle | | | | |
| 10 Sec. on/ | | | | |
| 10 Sec. off | | | | |
| 54V | | | | |
| 2.5MA | 5.0V | 1.2V | .2V | .01V |
| 5 Min. | .02MA | .2MA | .2MA | .1MA |
| 111V | | | | |
| 10MA | 4.5V | 2V | .3V | .03V |
| 5 Min. | .04MA | .2MA | .4MA | .2MA |
| 50% Duty Cycle | | | | |
| 10 Sec. on/ | | | | |
| 10 Sec. off | | | | |

From the above, it was noted that the electrical storage device was most efficiently charged by application of high power for a short period of time, it being appreciated that increase of charging time from 10 seconds to 1 minute did not produce a concomitant increase of stored charge. Additionally, interrupted or pulsed application of charging electricity was at least as effective as continuous charging over the same charging interval.

EXAMPLE V

An energy storage device was constructed using heavy duty Reynolds wrap aluminum cut in 20 cm by 20 cm square sheets. A polyethylene sheet of 0.1 mm thickness was cut into 20 cm by 20 cm square sheets and the inside 19.5 cm by 19.5 cm square section was removed. The polyethylene was glued to both sides of one aluminum sheet and one side each of two other aluminum sheets with epoxy glue. The aluminum was coated inside the polyethylene with DEADM prepared in accordance with Example II, the DEADM having been rehydrated to 30% water content by weight. The wet surface of the DEADM was dusted with dry dopamine melanin prepared in accordance with Example I, and the melanin coated aluminum sheets were pressed together with the polyethylene preventing the aluminum edges from making contact.

The electrical storage device was tested by charging at 200 v with 25 ma for 10 seconds and monitoring the voltage developed. The electrical storage device would not store more than 0.4 v which discharged completely in one minute. The electrical storage device was dehydrated by placing in an incubator at 50° C. for 24 hours and retested as before. The voltage developed was 0.78 v and discharged over a ten-minute period with no load. The electrical storage device was returned to the incubator for 48 hours for dehydration after which it developed the following voltage-time characteristics:

| TIME | VOLTAGE |
|---|---|
| 0 Min. | 1.5 V |
| 5 Min. | 1.06 V |
| 10 Min. | .93 V |
| 15 Min. | .84 V |
| 20 Min. | .77 V |
| 25 Min. | .71 V |
| 30 Min. | .67 V |
| 40 Min. | .58 V |
| 60 Min. | .45 V |
| 1Hr.20 Min. | .35 V |

The voltage decay time was measured with a 100 KΩ load and developed the following voltage-time characteristics:

| TIME | VOLTAGE |
|---|---|
| 0 Min. | 1 V |
| 4 Min. | .5 V |
| 8 Min. | .3 V |
| 16 Min. | .23 V |
| 30 Min. | .16 V |

EXAMPLE VI

An electrical storage device was constructed from the polymer material prepared in accordance with Example III (HQDEA) and three titanium metal plates of 2.5 cm by 2.5 cm area and 0.90 mm thickness. The HQDEA sludge was coated on both sides of one plate and one side of the other plates at a thickness of 0.2 mm. The plates were combined to form two laminations. The electrical storage device formed measured 3.5 mm in thickness and was allowed to remain at room temperature for ten days. After this period, the electrical storage device was charged at 200 v with 100 ma for ten seconds via electrodes formed by the end plates of the electrical storage device, and the voltage across the electrical storage device was measured with a voltmeter connected across the electrodes while current was measured with an ammeter connected in series with one electrode and one terminal of a piezoelectric buzzer having an impedance of 15 KΩ the other terminal of the buzzer being connected to the opposite electrode of the electrical storage device. As the electrical storage device commenced discharging through the buzzer, the voltage across the electrical storage device was 2 v and the current discharged was 0.4 ma. The buzzer was audibly operated for two minutes, and at the end of two minutes, the current discharged was 0.1 ma.

Oxidation-reduction polymers containing quinone and hydroquinone functional groups are insulators in their pure form and do not show appreciable electrical activity. When a liquid is adsorbed by the polymer, the electrical activity increases in proportion to the static dielectric constant of the liquid introduced to produce the oxidation-reduction polymer as a polymer-adsorbed liquid mixture. A given conductivity or electrical activity can be reached by introducing a moderate amount of high dielectric constant liquid or a larger amount of lower dielectric constant liquid. For water, a desired range of electrical activity is reached with a hydration range of 1% to 25% water by weight depending on the activity desired and the polymerization procedure with a preferred range of 10% to 15% water by weight allowing the best mechanical stability.

Electrical energy storage devices in accordance with the present invention can be constructed using mixtures of various oxidation-reduction polymers to form the oxidation-reduction polymer material; and, accordingly, it will be appreciated that the term "oxidation-reduction polymer material" as used herein is meant to include materials containing one or more oxidation-reduction polymers.

The storage of energy in the oxidation-reduction polymer material is not dependent on the switching characteristics of the polymer but rather is accomplished by removing electrons from less energetic sites and storing the electrons in higher energy sites in response to the supply of electrical energy delivered to the polymer material by an external source. The potential energy possessed by an electron depends upon the concentration of charge in its vicinity. The potential energy difference between two sites depends upon the difference in the potential energy of the electron at the site surrounded by a higher negative charge and the potential energy of the electron at the site containing less negative or even positive charge. The electrons from the cathode which bind protons are surrounded by negative hydroxyl ions. The sites at the anode which have lost an electron during charging are surrounded by positive proton ions. The site surrounded by hydroxyl or other negative charges released in the process of storing energy is the high energy site. The site surrounded by protons or other positive charges released in the process of storing charge is the low energy site.

Inasmuch as the present invention is subject to many variations, modifications and changes in detail, it is intended that all subject matter discussed above or shown in the accompanying drawings be interpreted as illustrative and not in a limiting sense.

What is claimed is:

1. A rechargeable electrical energy storage device comprising
    a pair of spaced electrodes; and
    an oxidation-reduction polymer material coated on said electrodes to store a charge when an electrical current is supplied thereto.

2. A rechargeable electrical energy storage device as recited in claim 1 wherein said oxidation-reduction polymer material has a range of hydration of 1 to 25% by weight.

3. A rechargeable electrical energy storage device as recited in claim 1 wherein said oxidation-reduction polymer material has a range of hydration of 10 to 15% by weight.

4. A rechargeable electrical energy storage device as recited in claim 1 wherein said oxidation-reduction polymer material includes quinone, semiquinone and hydroquinone randomly recurring units.

5. A rechargeable electrical energy storage device as recited in claim 4 wherein said oxidation-reduction polymer material includes a melanin polymer.

6. A rechargeable energy storage device as recited in claim 4 wherein said oxidation-reduction polymer material includes a polymer polymerized from hydroquinone and diethylamine.

7. A rechargeable electrical energy storage device comprising
a pair of spaced electrodes;
an oxidation-reduction polymer material coupled with said electrodes; and
a plurality of barrier laminations made of an electrically conductive material preventing ion passage therethrough, said barrier laminations being disposed in spaced relation in said oxidation-reduction polymer material to define layers of said oxidation-reduction polymer material whereby the charge gradient across said layers is cumulative.

8. A rechargeable electrical energy storage device as recited in claim 7 wherein said barrier laminations are made of metal.

9. A rechargeable electrical energy storage device as recited in claim 8 wherein said oxidation-reduction polymer material has a hydration range of from 1 to 25% water by weight.

10. A rechargeable electrical energy storage device as recited in claim 9 and further comprising a housing hermetically sealing said electrodes, said oxidation-reduction polymer material and said barrier laminations to maintain the hydration of said oxidation-reduction polymer material.

11. A rechargeable electrical energy storage device comprising
a plurality of layers of oxidation-reduction polymer material; and
a plurality of barrier laminations separating said layers of oxidation-reduction polymer material, said barrier laminations being electrically conductive to pass electrons while preventing passage of ions thereby providing charge separation when an energy gradient is produced in response to the supply of electrical energy to said electrical energy storage device.

12. A rechargeable electrical energy storage device as recited in claim 11 wherein electrodes are coupled to end layers of said oxidation-reduction polymer material.

13. A rechargeable electrical energy storage device as recited in claim 12 wherein said oxidation-reduction polymer material includes a polymer of quinone, semiquinone and hydroquinone randomly recurring units.

14. A rechargeable electrical energy storage device as recited in claim 13 wherein said oxidation-reduction polymer material has a hydration range of 1 to 25% by weight.

15. A rechargeable electrical energy storage device as recited in claim 14 and further comprising a housing hermetically sealing said oxidation-reduction polymer material, said barrier laminations and said electrodes to maintain said hydration range.

* * * * *